US009399939B2

(12) United States Patent
Shimamura et al.

(10) Patent No.: US 9,399,939 B2
(45) Date of Patent: Jul. 26, 2016

(54) COMBUSTION EXHAUST GAS TREATMENT SYSTEM AND METHOD OF TREATING COMBUSTION EXHAUST GAS (75) Inventors: Jun Shimamura, Hiroshima (JP); Toshio Katsube, Hiroshima (JP); Kouichi Yokoyama, Hiroshima (JP); Yoshihiro Kidera, Tokyo (JP); Nobuyoshi Mishima, Ibaraki (JP); Hisayuki Orita, Ibaraki (JP)

(73) Assignee: MITSUBISHI HITACHI POWER SYSTEMS, LTD., Yokohama (JP)

( * ) Notice: Subject to any disclaimer, the term of this patent is extended or adjusted under 35 U.S.C. 154(b) by 224 days.

(21) Appl. No.: 14/001,068

(22) PCT Filed: Jun. 19, 2012

(86) PCT No.: PCT/JP2012/003974
§ 371 (c)(1),
(2), (4) Date: Aug. 22, 2013

(87) PCT Pub. No.: WO2012/176430
PCT Pub. Date: Dec. 27, 2012

(65) Prior Publication Data
US 2013/0327025 A1 Dec. 12, 2013

(30) Foreign Application Priority Data

Jun. 20, 2011 (JP) ................................ 2011-136110

(51) Int. Cl.
*B01D 53/14* (2006.01)
*F01N 3/08* (2006.01)
*B01D 53/62* (2006.01)
*C01B 31/20* (2006.01)
*B01D 53/34* (2006.01)

(52) U.S. Cl.
CPC .............. *F01N 3/08* (2013.01); *B01D 53/1475* (2013.01); *B01D 53/343* (2013.01); *B01D 53/62* (2013.01);

(Continued)

(58) Field of Classification Search
None
See application file for complete search history.

(56) References Cited

U.S. PATENT DOCUMENTS

| 5,378,442 A | * | 1/1995 | Fujii | ................. B01D 53/1406 423/228 |
| 2008/0173584 A1 | * | 7/2008 | White | .................... C01B 31/20 210/656 |

(Continued)

FOREIGN PATENT DOCUMENTS

| JP | 59-026926 | 2/1984 |
| JP | 07-241440 | 9/1995 |

(Continued)

OTHER PUBLICATIONS

Machine Translation of JP 07241440, Translated on Jun. 1, 2014.*

(Continued)

*Primary Examiner* — Duane Smith
*Assistant Examiner* — Cabrena Holecek
(74) *Attorney, Agent, or Firm* — Fay Sharpe LLP (57) ABSTRACT A combustion exhaust gas treatment system comprising: a heat exchanger (A) for recovering heat contained in the combustion exhaust gas into heat medium, an absorption column for obtaining $CO_2$ removed gas by absorbing $CO_2$ in the combustion exhaust gas into absorbent, a heat exchanger (B) for applying heat recovered by heat medium to the $CO_2$ absorbed absorbent, a desorption column for desorbing the absorbent by removing $CO_2$ from the $CO_2$ absorbed absorbent, a flash tank for flash vaporizing the desorbed absorbent and a heat exchanger (E) for transferring heat from the desorbed absorbent to the $CO_2$ absorbed absorbent, wherein the $CO_2$ absorbed absorbent can be supplied from the absorption column to the desorption column via the heat exchanger (E) and the heat exchanger (B) in this order, and the desorbed absorbent can be supplied from the desorption column to the absorption column via the flash tank and the heat exchanger (E) in this order.

15 Claims, 4 Drawing Sheets (52) U.S. Cl.
CPC ....... *C01B 31/20* (2013.01); *B01D 2252/20478* (2013.01); *B01D 2257/30* (2013.01); *B01D 2257/404* (2013.01); *B01D 2257/504* (2013.01); *B01D 2258/0283* (2013.01); *B01D 2259/65* (2013.01); *Y02C 10/04* (2013.01); *Y02C 10/06* (2013.01); *Y02P 20/121* (2015.11); *Y02P 20/123* (2015.11); *Y02P 20/124* (2015.11); *Y02P 20/152* (2015.11); *Y02P 20/57* (2015.11)

(56) References Cited

U.S. PATENT DOCUMENTS

| | | | |
|---|---|---|---|
| 2008/0317651 | A1 | 12/2008 | Hooper et al. |
| 2009/0205946 | A1 | 8/2009 | Reddy et al. |
| 2010/0101462 | A1* | 4/2010 | Hayashi et al. ............... 110/190 |
| 2011/0088553 | A1* | 4/2011 | Woodhouse ....... B01D 53/1425 95/162 |

FOREIGN PATENT DOCUMENTS

| | | | | |
|---|---|---|---|---|
| JP | 07241440 | A * | 9/1995 | ............ B01D 53/62 |
| JP | 2001-239129 | | 9/2001 | |
| JP | 2009-247932 | | 10/2009 | |
| JP | 2010-088982 | | 4/2010 | |
| JP | 2011-036730 | | 2/2011 | |
| WO | WO 2011142376 | A1 * | 11/2011 | ............ B01D 53/75 |

OTHER PUBLICATIONS

Machine translation of WO 2011142376 A1 accessed Nov. 7, 2015.*

International Search Report mailed Oct. 9, 2012 for International Application No. PCT/JP2012/003974.

Supplementary European Search Report completed Jan. 30, 2015 for Application No. EP 12 80 2467.

* cited by examiner

COMBUSTION EXHAUST GAS TREATMENT SYSTEM AND METHOD OF TREATING COMBUSTION EXHAUST GAS

TECHNICAL FILED

The present invention relates to a combustion exhaust gas treatment system and a method of treating combustion exhaust gas to absorb and separate carbon dioxide ($CO_2$) in combustion exhaust gas of fossil fuel and the like. More specifically, the present invention relates to a combustion exhaust gas treatment system and a method of treating combustion exhaust gas having a high degree of freedom in plant design as well as high thermal efficiency and high $CO_2$ removal capability.

BACKGROUND ART

In thermal power generation facilities and boiler equipment, a large amount of fuels such as coal and heavy oil are burned, generating a large amount of carbon dioxide. In recent years, it has been proposed that discharge of carbon dioxide ($CO_2$) should be globally controlled in view of air pollution and global warming. As one of the techniques for separation and recovery of $CO_2$, known is a method of absorbing $CO_2$ into absorbent such as an amine compound, i.e., a chemical absorption method. This chemical absorption method requires a large amount of thermal energy. In the chemical absorption method, among total energy generated from combustion, energy that can be used for the original purposes such as power generation will be decreased, resulting in reduction of power generation efficiency. From an economical point of view, it is important to suppress the decrease in power generation efficiency to effectively utilize the thermal energy in equipment where the chemical absorption method is used.

As an approach for increasing thermal efficiency, for example, Patent Literature 1 discloses a method of purifying combustion exhaust gas comprising: contacting the combustion exhaust gas with absorbent in a $CO_2$ absorption column to absorb $CO_2$ in the combustion exhaust gas into the absorbent, the absorbent comprising an aqueous alkanolamine solution; applying heat contained in the combustion exhaust gas and heat of condensation of liquid vapor in the combustion gas to the $CO_2$ absorbed absorbent in a heat exchanger; heating the $CO_2$ absorbed absorbent in a desorption column and releasing $CO_2$ to regenerate the absorbent and then circulating the regenerated absorbent to the $CO_2$ absorption column.

Further, in the section of BACKGROUND ART and FIG. 7 of Patent Literature 1, disclosed is a combustion exhaust gas purifying equipment comprising a boiler, an electrostatic precipitator, a blower, a desulfurization device, a $CO_2$ absorption column, a $CO_2$ releasing desorption column and the like, wherein a gas/gas heater is provided between a line connecting the blower and the desulfurization device and a line connecting the absorption column and a chimney.

Further, Patent Literature 2 discloses flue gas treatment equipment in which a dust precipitator and a desulfurization device for treating smoke, dust and sulfur oxides contained in exhaust gas from a boiler are arranged in sequence from the upstream of an exhaust gas flow line, comprising a heat recovery device provided at the exhaust gas flow line between the precipitator and the desulfurization device, and a feed water line for supplying water to the boiler and a feed water heater provided at the feed water line, and an interconnecting line for heat medium circulation interconnecting the heat recovery device and the feed water heater.

Patent Literature 1: JP H7-241440 A
Patent Literature 2: JP 2001-239129 A

SUMMARY OF THE INVENTION

Problems to be Resolved by the Invention

The equipment according to Patent Literature 1 has high thermal efficiency and high removal capability. Nonetheless, there is limitation in arrangement of each device because a plurality of heat exchangers need to be provided in the middle of the line transporting absorbent from the $CO_2$ absorption column to the desorption column. A material having resistance to both combustion exhaust gas and absorbent has to be selected for use in the heat exchangers. Therefore, the degree of freedom in plant design is low. In addition, further improvement of thermal efficiency is demanded in view of improving power generation efficiency.

An object of the present invention is to provide a combustion exhaust gas treatment system and a method of treating combustion exhaust gas, having a high degree of freedom in plant design as well as high thermal efficiency and high removal capability. Another object of the present invention is to provide a combustion exhaust gas treatment system and a method of treating combustion exhaust gas, wherein decrease in temperature of $CO_2$ absorbent supplied to a desorption column can be prevented, the consumption of steam extracted from a turbine system can be reduced, and decrease in power generation efficiency can be suppressed.

Means for Solving the Problems

Figure 4:
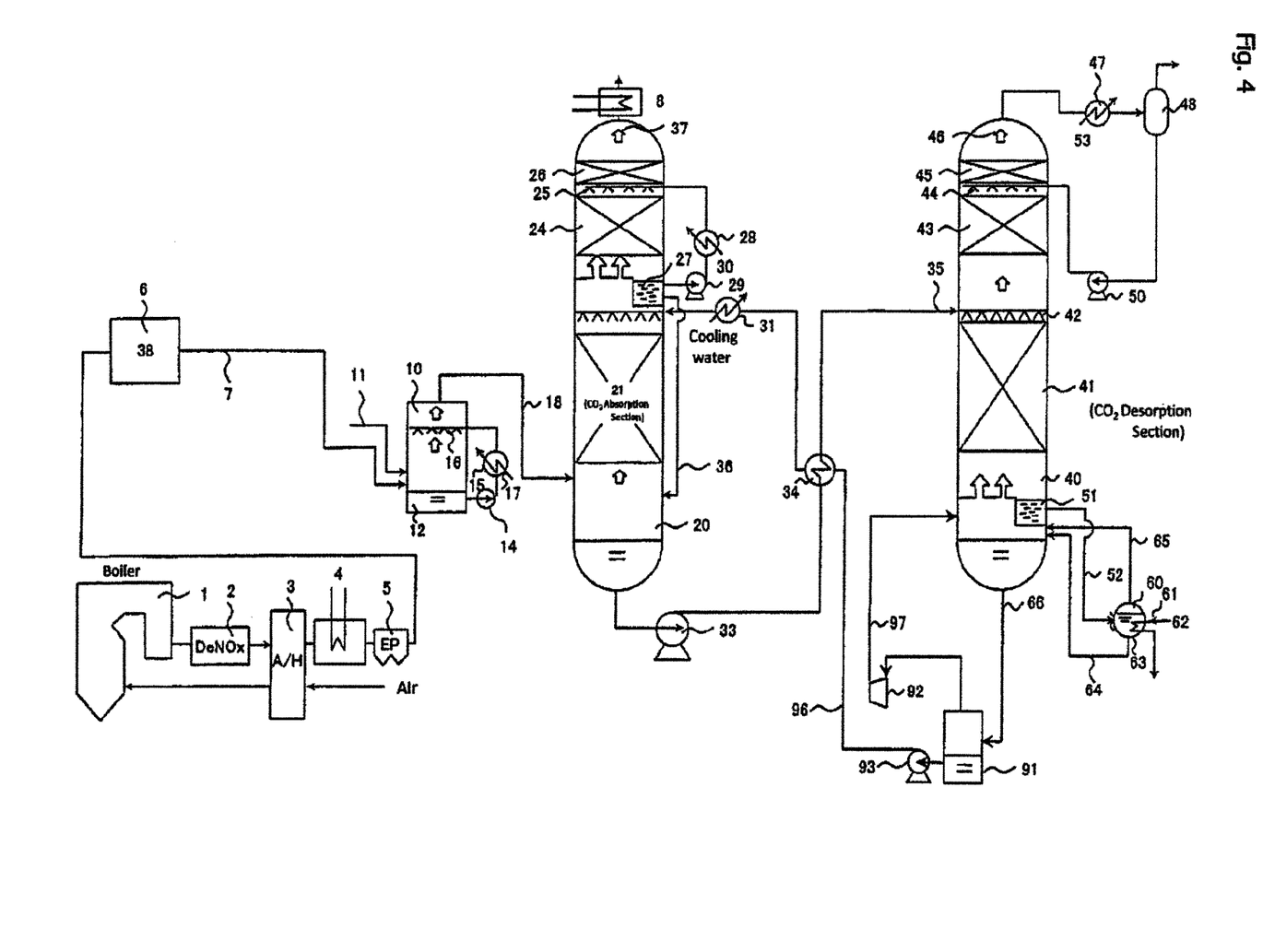
FIG. 4 shows a combustion exhaust gas treatment system that the present inventors examined first.

The present inventors have tried to improve the system shown in FIG. 7 of Patent Literature 1 in order to achieve the above objects. FIG. 4 shows the improved system. The system shown in FIG. 4 is provided with a flash tank and a vapor recompression apparatus below a desorption column. $CO_2$ absorbent pooled in a liquid reservoir at the bottom of Desorption Column 40 can be supplied to Flash Tank 91, decompressed through Pressure Regulating Valve 67 by taking advantage of a pressurized condition of about 0.1 MPa (g) in Desorption Column 40, and vaporized under reduced pressure in Flash Tank 91 to generate saturated vapor. Compressor 92 serves to recompress the vapor vaporized under reduced pressure in Flash Tank 91 and to transport the vapor to Desorption Column 40. A liquid phase in Flash Tank 91 is pressurized with Pump 93 via Flash Tank Outlet Line 96 and cooled by Heat Exchanger 34 and Condenser 31 before supplied to $CO_2$ Absorption Column 20. It appears that Steam 62 to be supplied to Reboiler 60 can be reduced since absorbent vapor can be passed to the desorption column through the flash tank and the vapor recompression apparatus. When the pressure of Flash Tank 91 is controlled to be near the normal pressure (0 MPa (g)) by Pressure Gage 68 and Pressure Regulating Valve 67, heat is used most efficiently. However, when operated under this condition, the temperature of $CO_2$ absorbent in Flash Tank 91 is decreased to, for example, about 100 to 105° C. When the temperature of absorbent from the flash tank is decreased, heat exchange in Heat Exchanger 34 of normal size alone may not maintain the temperature of $CO_2$ absorbent at the inlet of Desorption Column 40 at a predetermined temperature (for example, 95 to 105° C.). Decrease in the temperature of absorbent which flows into the desorption column reduces calorific value supplied to Desorption Column 40. As a result, the flow rate of Steam 62 to Reboiler 60 has to be increased. In order to maintain absorbent which flows into the desorption column at predetermined temperature, a very large heat transfer area is required for Heat Exchanger 34, which leads to a significant economic disadvantage.

Accordingly, after additional studies, the present inventors have completed the invention having the following aspects.

[1] A combustion exhaust gas treatment system comprising: a combustion apparatus, a heat exchanger (A) for recovering heat contained in gas discharged from the combustion apparatus into heat medium, an absorption column for obtaining $CO_2$ removed gas by contacting the exhaust gas with absorbent to absorb $CO_2$ in the exhaust gas into the absorbent, a desorption column for regenerating the absorbent by releasing $CO_2$ from the $CO_2$ absorbed absorbent, a reboiler for vaporizing the absorbent to supply heat to the desorption column, a flash tank for flash vaporizing the regenerated absorbent, and a heat exchanger (E) for transferring heat from the regenerated absorbent to the $CO_2$ absorbed absorbent; the $CO_2$ absorbed absorbent being able to be supplied from the absorption column to the desorption column via the heat exchanger (E), and the regenerated absorbent being able to be supplied from the desorption column to the absorption column via the flash tank and the heat exchanger (E) in this order, wherein the system further comprises a heat exchanger (B) provided between the heat exchanger (E) and the desorption column to apply the heat recovered by the heat medium to the $CO_2$ absorbed absorbent and/or a heat exchanger (C) provided between the flash tank and the heat exchanger (E) to apply the heat recovered by the heat medium to the desorbed absorbent.

[2] The combustion exhaust gas treatment system according to [1], further comprising a heat exchanger (D) for applying the heat recovered by the heat medium to the $CO_2$ removed gas.

[3] The combustion exhaust gas treatment system according to [1] or [2], further comprising a vapor recompression apparatus for compressing vapor withdrawn from an upper part of the flash tank to be fed to the desorption column.

[4] The combustion exhaust gas treatment system according to any one of [1] to [3], further comprising a wet flue gas desulfurization device provided between the heat exchanger (A) and the absorption column to remove sulfur oxides in the exhaust gas.

[5] The combustion exhaust gas treatment system according to any one of [1] to [4], further comprising a denitration device provided between the combustion apparatus and the heat exchanger (A) to remove nitrogen oxides in the exhaust gas.

[6] The combustion exhaust gas treatment system according to any one of [1] to [5], wherein the absorbent comprises an amine compound as a main component.

[7] A method of treating combustion exhaust gas, the method comprising the steps of: recovering heat contained in the combustion exhaust gas into heat medium in the heat exchanger (A), obtaining $CO_2$ removed gas by contacting the combustion exhaust gas with absorbent to absorb $CO_2$ in the combustion exhaust gas into the absorbent, releasing $CO_2$ from the $CO_2$ absorbed absorbent to regenerate the absorbent, flash vaporizing the regenerated absorbent, and performing heat exchange between the flash vaporized absorbent and the $CO_2$ absorbed absorbent in the heat exchanger (E), wherein the method further comprises the steps of: performing heat exchange in the heat exchanger (E) and then applying the heat recovered by the heat medium to the $CO_2$ absorbed absorbent in the heat exchanger (B); and/or applying the heat recovered by the heat medium to the flash vaporized absorbent in the heat exchanger (C) before performing heat exchange in the heat exchanger (E).

[8] The method of treating combustion exhaust gas according to [7], further comprising the step of applying the heat recovered by the heat medium to the $CO_2$ removed gas in the heat exchanger (D).

Advantageous Effects of the Invention

The combustion exhaust gas treatment system or the method of treating combustion exhaust gas according to the present invention has a high degree of freedom in plant design as well as high thermal efficiency and high $CO_2$ removal capability. In addition, according to the present invention, the consumption of Steam 62 extracted from a turbine system can be reduced, and decrease in power generation efficiency can be suppressed by heating $CO_2$ absorbent with sensible heat recovered from exhaust gas in Gas Cooler 4 through heat medium in Heater 38a or 38b provided in a $CO_2$ absorbent line at an inlet or outlet of Desorption Column 40 and increasing calorific value to be supplied to Desorption Column 40.

EMBODIMENTS FOR CARRYING OUT THE INVENTION

Referring to the drawings, the embodiments according to the present invention will be described below. It should be understood that the present invention is not limited to the embodiments described below, and that modification, addition or omission can be made without departing from the object or the spirit of the present invention.

Embodiment 1

Figure 1:
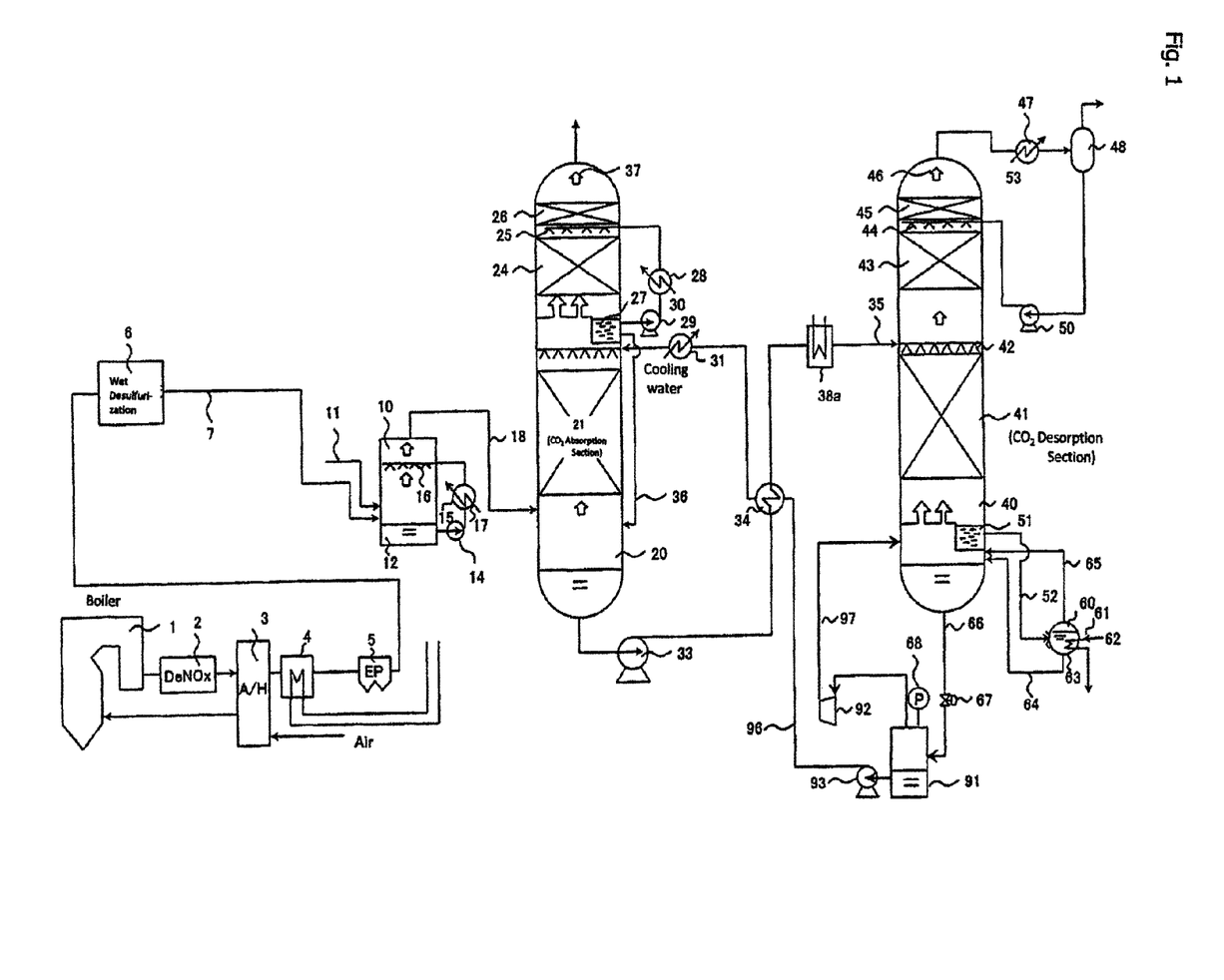
FIG. 1 shows a combustion exhaust gas treatment system of Embodiment 1 according to the present invention.

FIG. 1 shows a combustion exhaust gas treatment system of Embodiment 1 according to the present invention. This combustion exhaust gas treatment system is, for example, a part of a power generation plant. This combustion exhaust gas treatment system comprises Boiler (Combustion Apparatus) 1, Denitration Device 2, Air Heater 3, Gas Cooler (Heat Exchanger (A)) 4, Electrostatic Precipitator 5, Wet Desulfurization Device 6, Pre-scrubber 10, $CO_2$ Absorption Column 20, Desorption Column 40, Reboiler 60, Flash Tank 91 and the like.

Combustion exhaust gas of fossil fuels such as coal and the like discharged from Boiler 1 is passed through Denitration Device 2 to remove nitrogen oxides, and then heat exchanged with air in Air Heater 3 to cool down to, for example, 130 to 220° C. The air heated in Air Heater 3 is supplied to Boiler 1. The exhaust gas passed through Air Heater 3 is cooled in Gas Cooler 4, for example, down to about 85 to 100° C. Heat contained in the exhaust gas is recovered into heat medium in this cooling. Sulfur oxide ($SO_3$) in the exhaust gas is absorbed into smoke and dust. Electrostatic precipitator 5 removes smoke and dust in the exhaust gas along with $SO_3$. Then, it is pressurized with an induced draft fan, and sulfur oxide ($SO_2$) is removed in Wet Desulfurization Device 6. About 10 ppm of $SO_2$ usually remains in outlet gas from Wet Desulfurization Device 6. This residual $SO_2$ may deteriorate $CO_2$ absorbent in $CO_2$ Absorption Column 20. In order to prevent this, Pre-scrubber 10 is preferably provided before Absorption Column 20 to minimize residual $SO_2$ as much as possible (for example, 10 ppm or less).

$CO_2$ Absorption Column 20 comprises Packed Bed 21, Absorbent Spray Section 22, Water Washing Section 24, Washing Water Spray Section 25, Demister 26, Washing Water Reservoir 27, Condenser 28, Washing Water Pump 29 and the like. In Packed Bed 21, $CO_2$ contained in the exhaust gas is subjected to gas-liquid contacts with $CO_2$ absorbent supplied from the $CO_2$ absorbent spray section located at the upper part of the $CO_2$ Absorption Column 20, and absorbed into the $CO_2$ absorbent. Heat is generated at the time of $CO_2$ absorption. The temperature of the $CO_2$ removed gas (de-$CO_2$ gas) is increased by this heat. In Water Washing Section 24, the $CO_2$ removed gas is cooled and mist coming along with the $CO_2$ removed gas is removed. Further, washing water cooled by Condenser 28 is recirculated for use through Washing Water Pump 29. Demister 26 provided above Water Washing Section 24 removes mist which is not able to be removed in the water washing section, and the treated gas (de-$CO_2$ gas) 37 is discharged. Absorbent comprising an amine compound as a main component is preferably used.

The $CO_2$ absorbed absorbent is withdrawn from the liquid reservoir at the lower part of Absorption Column 20 by Absorption Column Withdrawal Pump 33, and heated to, for example, 95 to 105° C. in Heat Exchanger 34. In the embodiment according to the present invention shown in FIG. 1, Heater (Heat Exchanger (B)) 38a is provided in $CO_2$ Absorbent Supply Line 35 leading to Desorption Column 40. The heat source of Heater 38a is heat medium which has recovered heat in Gas Cooler 4. With Heater 38a, the absorbent flowing into the desorption column can be heated to a predetermined temperature (for example, 95 to 105° C.). By this, the consumption of Steam 62 extracted from a turbine system can be reduced, and decrease in power generation efficiency can be suppressed.

In Desorption Column 40, $CO_2$ enriched absorbent which is sprayed from Spray Section 42 is supplied to Packed Bed 41. Meanwhile, in Reboiler 60 provided at the bottom of Desorption Column 40, absorbent is vaporized by heat supplied via Steam Supply Line 65. In Packed Bed 41, as the $CO_2$ enriched absorbent is subjected to gas-liquid contacts with absorbent vapor ascending from the bottom, $CO_2$ is released from the absorbent. Mist of absorbent goes together into the released $CO_2$ gas, and the mist is removed in Water Washing Section 43. Demister 45 provided above Water Washing Section 43 removes mist which is not able to be removed in the water washing section. $CO_2$ Gas 46 is discharged from the top of Desorption Column 40. This $CO_2$ gas is cooled down to about 40° C. in Condenser 47 and separated into gas and condensed water in $CO_2$ Separator 48. The $CO_2$ gas is introduced into a $CO_2$ liquefying apparatus (not shown) while the condensed water is returned to the washing water spray section by Drain Pump 50.

Meanwhile, the $CO_2$ released $CO_2$ absorbent is pooled in Desorption Column Liquid Reservoir 51. Subsequently, it is passed to Reboiler 60 through Reboiler Liquid Supply Line 52. A heat exchanger tube and the like is provided inside Reboiler 60 and $CO_2$ absorbent is indirectly heated by Steam 62 supplied via the steam supply line such that absorbent vapor is generated inside Reboiler 60 and supplied to Desorption Column 40 via Vapor Supply Line 65. Steam 62 used in Reboiler 60 is returned to drain water in the heat exchanger tube to be collected.

In Embodiment 1, the vapor recompression apparatus comprising Compressor 92, Line 97 and the like, and Flash Tank 91 are provided. $CO_2$ absorbent pooled in the liquid reservoir at the bottom of Desorption Column 40 is supplied to Flash Tank 91. It is decompressed through Pressure Regulating Valve 67 by taking advantage of a pressurized condition of about 0.1 MPa (g) in Desorption Column 40, and vaporized under reduced pressure in the Flash Tank 91 to generate saturated vapor. Compressor 92 serves to recompress the vapor vaporized under reduced pressure in Flash Tank 91 and to transport the vapor to Desorption Column 40. The liquid phase in Flash Tank 91 is pressurized with Pump 93 via Flash Tank Outlet Line 96 and cooled by Heat Exchanger 34 and Condenser 31 before supplied to $CO_2$ Absorption Column 20.

In Embodiment 1, by flash vaporizing absorbent in Flash Tank 91 and heating absorbent in Heater (Heat Exchanger (B)) 38a, the consumption of Steam 62 supplied to Reboiler 60 can be reduced, and decrease in power generation efficiency can be suppressed.

Embodiment 2

Figure 2:
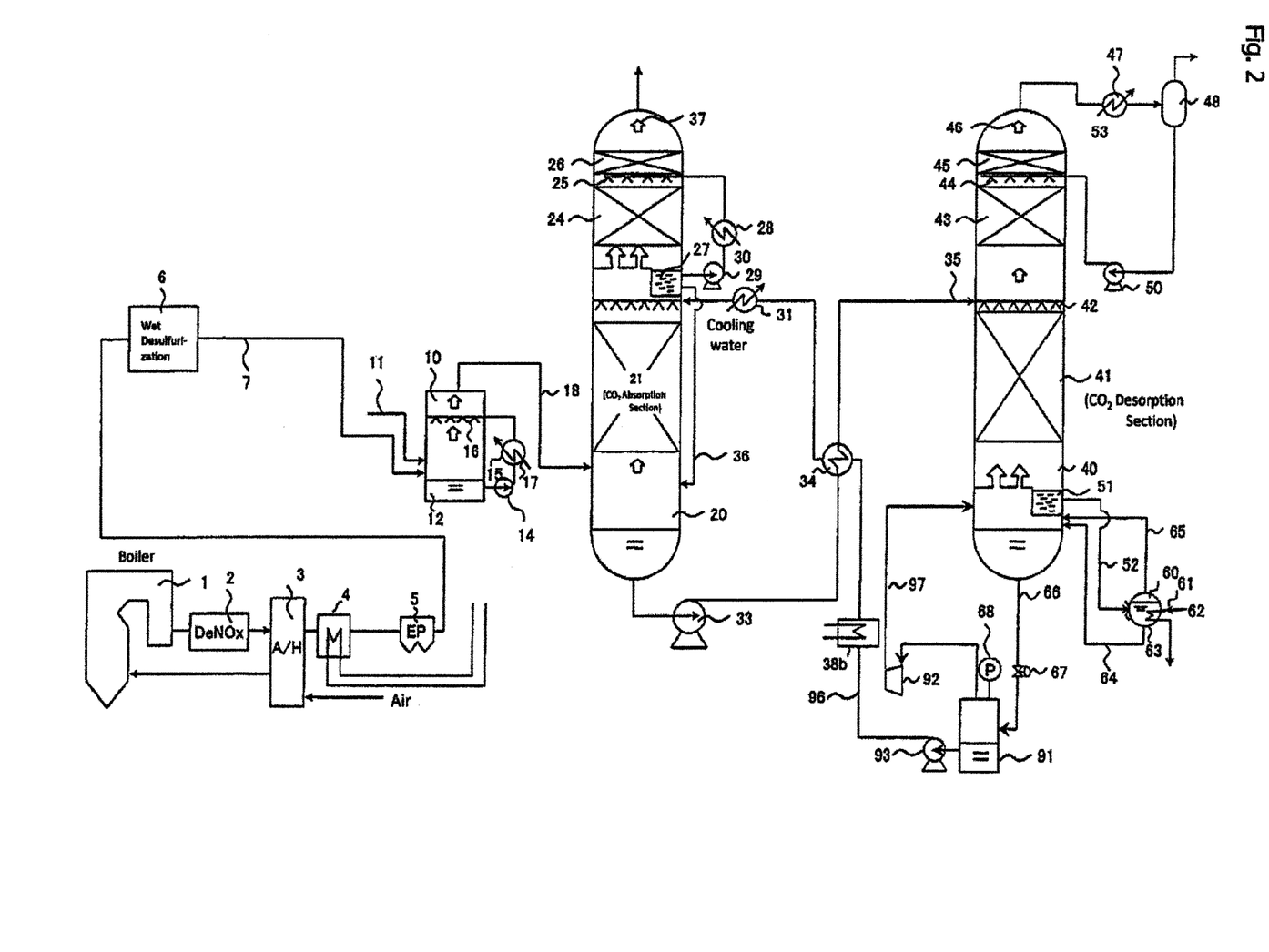
FIG. 2 shows a combustion exhaust gas treatment system of Embodiment 2 according to the present invention.

FIG. 2 shows a combustion exhaust gas treatment system of Embodiment 2 according to the present invention.

In the system shown in FIG. 2, Heater (Heat exchanger (C)) 38b is provided at Outlet Line 96 of Flash Tank 91. The heat source of Heater 38b is heat medium which has recovered heat in Gas Cooler 4. Regenerated $CO_2$ absorbent is heated in Heater 38b to a temperature (for example, 130° C. or higher) at which absorbent flowing into the desorption column can be heated by heat exchange in Heat Exchanger 34. Then the absorbent flowing into the desorption column can be easily brought to a predetermined temperature (for example, 95 to 105° C.) in Heat Exchanger 34. As a result, the consumption of Steam 62 extracted from a turbine system can be reduced, and decrease in power generation efficiency can be suppressed.

Embodiment 3

Figure 3:
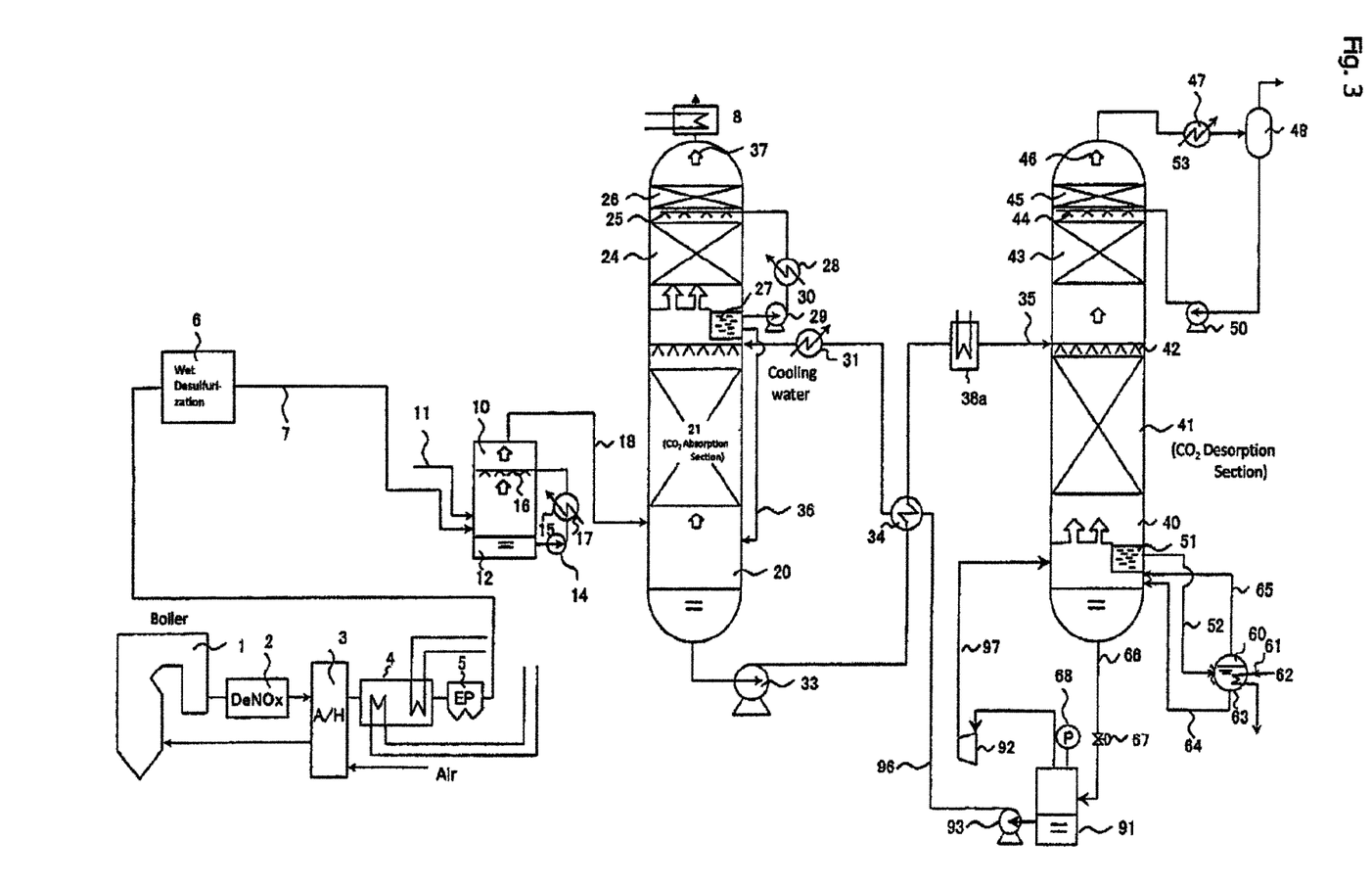
FIG. 3 shows a combustion exhaust gas treatment system of Embodiment 3 according to the present invention.

FIG. 3 shows a combustion exhaust gas treatment system of Embodiment 3 according to the present invention.

In the system shown in FIG. 3, Gas Reheater (Heat Exchanger (D)) 8 is provided at $CO_2$ Absorption Column 20. Heater (Heat Exchanger (B)) 38a is also provided as in the system shown in FIG. 1. The heat source of Heater 38a and Gas Reheater 8 is heat medium which has recovered heat in Gas Cooler 4. $CO_2$ absorbed absorbent is heated to a predetermined temperature (for example, 95 to 105° C.) by Heater 38a. By this, the consumption of Steam 62 extracted from a turbine system can be reduced, and decrease in power generation efficiency can be suppressed. Further, sensible heat recovered in Gas Cooler 4 can be used for reheating $CO_2$ Removed Gas 37 through heat medium by Gas Reheater 8 provided at the top of Absorption Column 20.

EXPLANATION OF SYMBOLS

1: Boiler;
2: Denitration Device;
3: Air Heater;
4: Gas Cooler (Heat Exchanger (A));
5: Dry Electrostatic Precipitator;
6: Wet Desulfurization Device;

7: Desulfurization Outlet Exhaust Gas;
8: Gas Reheater (Heat Exchanger (D));
10: Pre-scrubber;
11: Absorbent;
12: Liquid Reservoir;
14: Circulating Pump;
15: Condenser;
16: Spray Section;
17: Cooling Water;
18: Pre-scrubber Outlet Gas;
20: Absorption Column;
21: Packed Bed;
22: Absorbent Spray Section;
23: De-$CO_2$ Gas;
24: Water Washing Section;
25: Washing Water Spray Section;
26: Demister;
27: Absorption Column Washing Water Reservoir;
28: Condenser;
29: Washing Water Pump;
30: Cooling Water;
31: Condenser;
32: Boiler Water;
33: Absorption Column Withdrawal Pump;
34: Heat Exchanger (E);
35: Desorption Column Liquid Supply Line;
36: Washing Water Withdrawal Line;
37: Treated Gas;
38a: Amine Heater (Heat Exchanger (B));
38b: Amine Heater (Heat Exchanger (C));
40: Desorption Column;
41: Packed Bed;
42: Spray Section;
43: Water Washing Section;
44: Washing Water Spray Section;
45: Demister;
46: $CO_2$ Gas;
47: Condenser;
48: $CO_2$ Separator;
49: Drain Line;
50: Drain Pump;
51: Desorption Column Liquid Reservoir;
52: Reboiler Liquid Supply Line;
60: Reboiler;
61: Steam Supply Line;
62: Steam;
63: Reboiler Liquid Reservoir;
64: Reboiler Liquid Withdrawal Line;
65: Vapor Supply Line;
66: Desorption Column Liquid Withdrawal Line;
67: Pressure Regulating Valve;
68: Pressure Gage;
91: Flash Tank;
92: Compressor;
93: Pump;
96: $CO_2$ Absorbent Supply Line;
97: Vapor Line;

The invention claimed is:

1. A combustion exhaust gas treatment system comprising:
a combustion apparatus for generating an exhaust gas,
an air heater,
a heat exchanger (A) for recovering heat contained in the exhaust gas into a heat medium,
an electrostatic precipitator,
a wet desulfurization device,
a pre-scrubber,
an absorption column for contacting the exhaust gas with an absorbent to absorb $CO_2$ in the exhaust gas into the absorbent to obtain a $CO_2$ absorbed absorbent and a $CO_2$ removed gas, in which the exhaust gas is discharged from the combustion apparatus through, in sequence, the air heater, the heat exchanger (A), the electrostatic precipitator, the wet desulfurization device and the pre-scrubber, and is introduced to the absorption column,
a desorption column for releasing $CO_2$ from the $CO_2$ absorbed absorbent to obtain a regenerated absorbent,
a reboiler for vaporizing the regenerated absorbent to supply heat to the desorption column,
a flash tank for flash vaporizing the regenerated absorbent,
a heat exchanger (E) for transferring heat from the regenerated absorbent to the $CO_2$ absorbed absorbent; and
a heat exchanger (B) provided between the heat exchanger (E) and the desorption column to apply heat recovered by the heat medium to the $CO_2$ absorbed absorbent;
the $CO_2$ absorbed absorbent being able to be supplied from the absorption column to the desorption column via the heat exchanger (E), and the regenerated absorbent being able to be supplied from the desorption column to the absorption column via the flash tank and the heat exchanger (E).

2. The combustion exhaust gas treatment system according to claim 1, further comprising a heat exchanger (D) for applying the heat recovered by the heat medium to the $CO_2$ removed gas.

3. The combustion exhaust gas treatment system according to claim 1, further comprising a vapor recompression apparatus for compressing vapor withdrawn from an upper part of the flash tank to be fed to the desorption column.

4. The combustion exhaust gas treatment system according to claim 1, further comprising a denitration device provided between the combustion apparatus and the air heater to remove nitrogen oxides in the exhaust gas.

5. The combustion exhaust gas treatment system according to claim 1, wherein the absorbent comprises an amine compound as a main component.

6. A method of treating combustion exhaust gas, the method comprising the steps of:
discharging a combustion exhaust gas from a combustion apparatus,
passing the combustion exhaust gas through an air heater,
recovering heat contained in the combustion exhaust gas discharged from the air heater into heat medium in a heat exchanger (A),
passing the combustion exhaust gas discharged from the heat exchanger (A) through, in sequence, an electrostatic precipitator, a wet desulfurization device and a pre-scrubber,
contacting the combustion exhaust gas with absorbent to absorb $CO_2$ in the combustion exhaust gas into the absorbent to obtain a $CO_2$ removed gas and a $CO_2$ absorbed absorbent,
releasing $CO_2$ from the $CO_2$ absorbed absorbent to obtain a regenerated absorbent,
flash vaporizing the regenerated absorbent to obtain a flash vaporized absorbent,
performing heat exchange between the flash vaporized absorbent and the $CO_2$ absorbed absorbent in a heat exchanger (E), and then
applying the heat recovered by the heat medium to the $CO_2$ absorbed absorbent in a heat exchanger (B) after performing heat exchange in the heat exchanger (E).

7. The method of treating combustion exhaust gas according to claim 6, further comprising the step of applying the heat recovered by the heat medium to the $CO_2$ removed gas in a heat exchanger (D).

8. The system according to claim 1, further comprising:
a heat exchanger (C) provided between the flash tank and the heat exchanger (E) to apply the heat recovered by the heat medium to the desorbed absorbent.

9. A combustion exhaust gas treatment system comprising:
a combustion apparatus for generating an exhaust gas,
an air heater,
a heat exchanger (A) for recovering heat contained in the exhaust gas into a heat medium,
an electrostatic precipitator,
a wet desulfurization device,
a pre-scrubber,
an absorption column for contacting the exhaust gas with an absorbent to absorb $CO_2$ in the exhaust gas into the absorbent to obtain a $CO_2$ absorbed absorbent and a $CO_2$ removed gas, in which the exhaust gas is discharged from the combustion apparatus through, in sequence, the air heater, the heat exchanger (A), the electrostatic precipitator, the wet desulfurization device and the pre-scrubber, and is introduced into the absorption column,
a desorption column for releasing $CO_2$ from the $CO_2$ absorbed absorbent to obtain a regenerated absorbent,
a reboiler for vaporizing the regenerated absorbent to supply heat to the desorption column,
a flash tank for flash vaporizing the regenerated absorbent,
a heat exchanger (E) for transferring heat from the regenerated absorbent to the $CO_2$ absorbed absorbent, and
a heat exchanger (C) provided between the flash tank and the heat exchanger (E) to apply the heat recovered by the heat medium to the regenerated absorbent,
the $CO_2$ absorbed absorbent being able to be supplied from the absorption column to the desorption column via the heat exchanger (E), and the regenerated absorbent being able to be supplied from the desorption column to the absorption column via the flash tank and the heat exchanger (E).

10. The combustion exhaust gas treatment system according to claim 9, further comprising a heat exchanger (D) for applying the heat recovered by the heat medium to the $CO_2$ removed gas.

11. The combustion exhaust gas treatment system according to claim 9, further comprising a vapor recompression apparatus for compressing vapor withdrawn from an upper part of the flash tank to be fed to the desorption column.

12. The combustion exhaust gas column according to claim 9, further comprising a denitration device provided between the combustion apparatus and the air heater to remove nitrogen oxides in the exhaust gas.

13. The combustion exhaust gas treatment system according to claim 9, wherein the absorbent comprises an amine compound as a main component.

14. A method of treating combustion exhaust gas, the method comprising the steps of:
discharging a combustion exhaust gas from a combustion apparatus,
passing the combustion exhaust gas through an air heater,
recovering heat contained in the combustion exhaust gas discharged from the air heater into a heat medium in a heat exchanger (A),
passing the combustion exhaust gas discharged from the heat exchanger (A) through, in sequence, an electrostatic precipitator, a wet desulfurization device and a pre-scrubber,
contacting the combustion exhaust gas with an absorbent to absorb $CO_2$ in the combustion exhaust gas into the absorbent to obtain a $CO_2$ removed gas and a $CO_2$ absorbed absorbent,
releasing $CO_2$ from the $CO_2$ absorbed absorbent to obtain a regenerated absorbent,
flash vaporizing the regenerated absorbent to obtain a flash vaporized absorbent,
performing heat exchange between the flash vaporized absorbent and the $CO_2$ absorbed absorbent in a heat exchanger (E), and then
applying the heat recovered by the heat medium to the flash vaporized absorbent in a heat exchanger (C) before performing heat exchange in the heat exchanger (E).

15. The method of treating combustion exhaust gas according to claim 14, further comprising the step of applying the heat recovered by the heat medium to the $CO_2$ removed gas in a heat exchanger (D).

* * * * *